July 20, 1954     H. W. GOSS     2,684,254
SWAY STABILIZER FOR VEHICLES

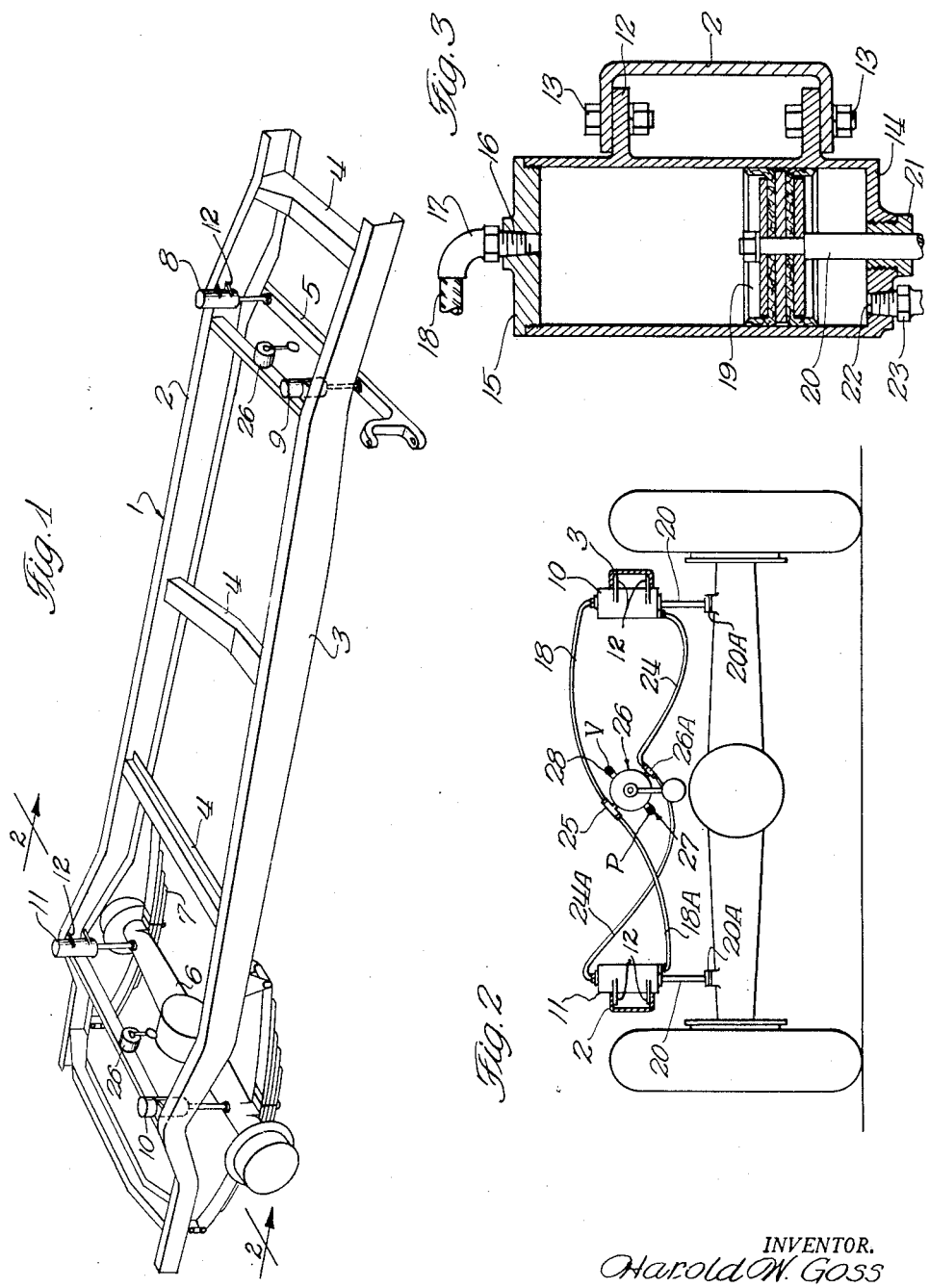

Filed Sept. 7, 1950     3 Sheets—Sheet 2

INVENTOR.
Harold W. Goss
BY
James L. Kinnan
ATT'Y

July 20, 1954  H. W. GOSS  2,684,254
SWAY STABILIZER FOR VEHICLES
Filed Sept. 7, 1950  3 Sheets-Sheet 3
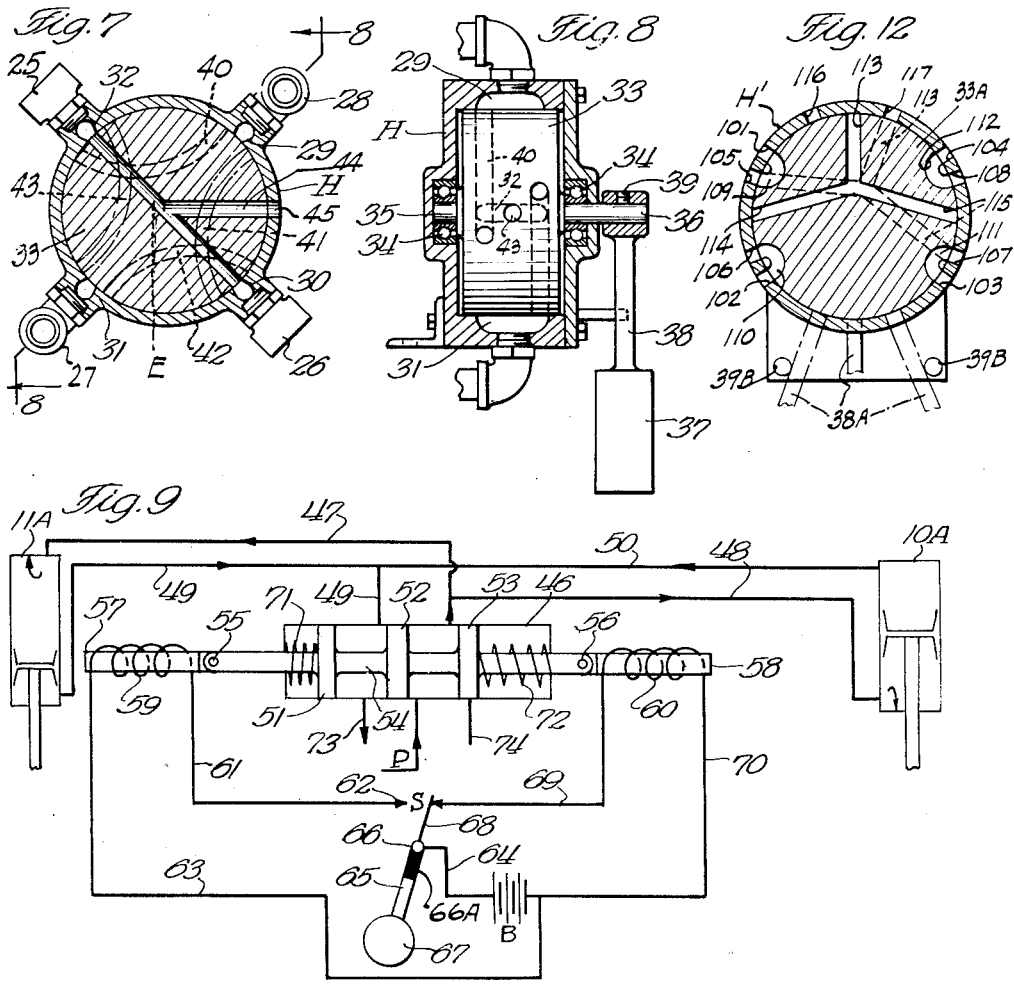
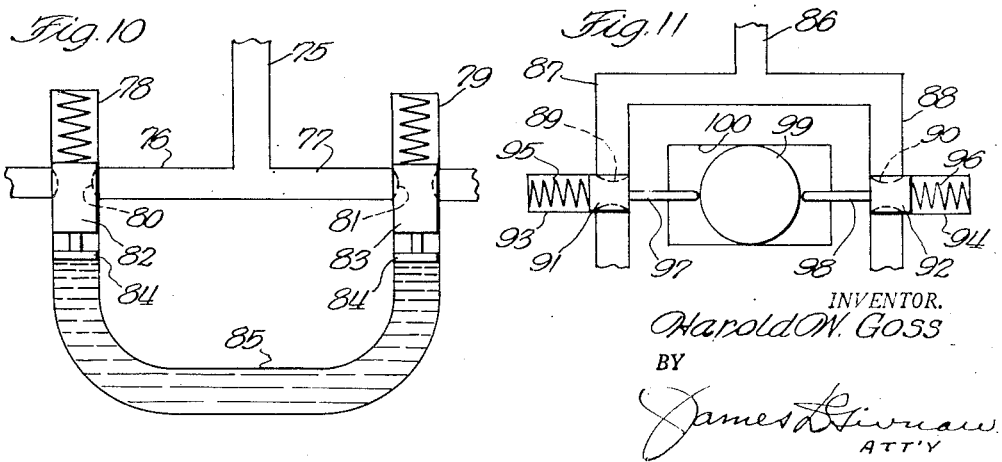
INVENTOR.
Harold W. Goss
BY
James L. Livman
ATT'Y Patented July 20, 1954

2,684,254

UNITED STATES PATENT OFFICE 2,684,254

SWAY STABILIZER FOR VEHICLES

Harold W. Goss, Bandon, Oreg.

Application September 7, 1950, Serial No. 183,488

1 Claim. (Cl. 280—112)

This invention relates to improvements in sway stabilizers for vehicles such as automobiles, trucks and the like.

It is one of the principal objects of the invention to provide automatically actuated pressure and/or vacuum means connected with both ends of the front axle and both ends of the rear axle of the vehicle, said means being actuated by a valve operated by a pendulum adapted to swing to the left or right in accordance with turns being negotiated by the vehicle.

A still further object is the provision of a stabilizer of this character which is of simple, efficient, durable and inexpensive construction, containing interchangeable parts made from single castings.

These and other objects will appear as my invention is more fully hereinafter described in the following specification, illustrated in the accompanying drawings and finally pointed out in the appended claim.

In the drawing:

Figure 1 is a perspective view of a vehicle chassis (with wheels removed) equipped with sway-stabilizing apparatus made in accordance with my invention.

Figure 2 is a sectional end elevation taken approximately along the line 2—2 of Figure 1 and including the rear wheels of the vehicle.

Figure 3 is an enlarged sectional view of a chassis frame member, and of pressure cylinder secured thereto and a piston slidably mounted in the cylinder.

Figure 7 is a sectional front elevation of a pressure and vacuum distributing valve.

Figure 8 is a sectional side elevation taken approximately along the line 8—8 of Figure 7.

Figure 9 is a diagrammatic view and wiring diagram of a modified form of the invention.

Figures 10 and 11 are diagrammatic views of further modified forms of the invention, and Fig. 12 is a further modification.

Figure 4:
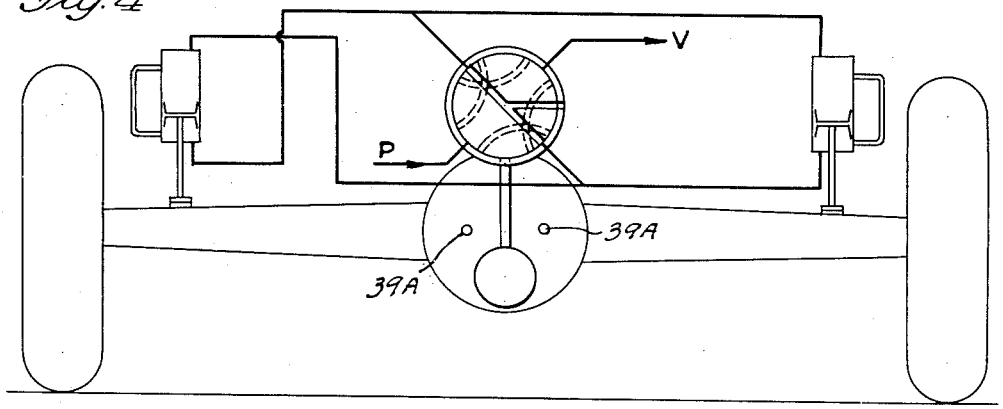
Figures 4, 5 and 6 are diagrammatic views illustrating various stages of operation of a vehicle equipped with the invention.
Figure 5:
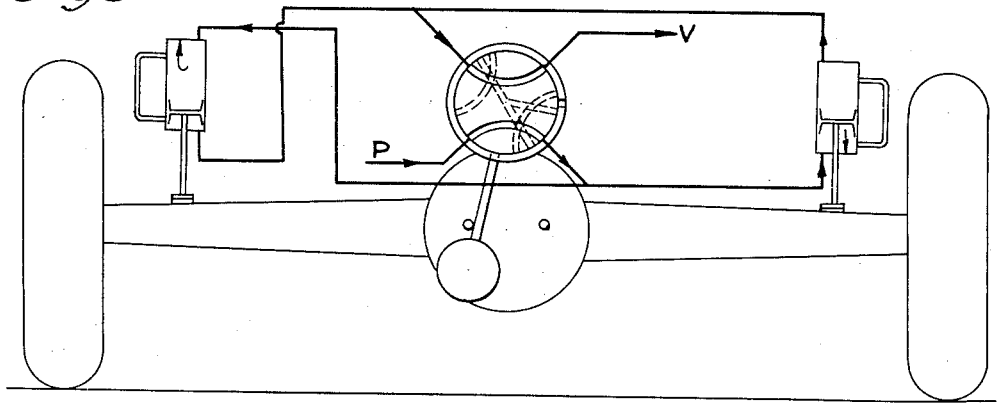

Referring now more particularly to the drawings:

In Figure 1 reference numeral 1 indicates, generally, a vehicle chassis comprising two longitudinal channel frame members indicated at 2 and 3 and joined together by the usual cross members 4 and assembled in the conventional manner. The forward end of the chassis is provided with the usual front axle 5 and spring assembly (not shown), and the rearward end with a rear axle assembly 6 carried by springs 7 attached to the chassis, also in the conventional manner. Above each front and rear axle I secure to the chassis two pairs of cylinders 8—9 and 10—11, respectively. As best illustrated in Figure 3, each cylinder is provided with lugs 12 by means of which it is bolted as at 13 to the frame members of the chassis. Each pair of cylinders is connected to a pressure and vacuum distributor valve. As all of the cylinders are identical, as are both distributor valves, a description of one of each will suffice for all.

The bottom end of the cylinder is closed by an integral wall 14 and its top end by a removable end wall 15. The top wall is formed with a threaded opening 16 to receive a fitting 17 to which is attached a pressure line 18 (the cylinder now being indicated at 10 in Figure 2) for applying air pressure or a vacuum to the interior of the cylinder above the piston 19. Each piston is provided with a shaft 20 which slidably extends through a bushing in the form of a packing gland 21 provided in the bottom end wall 14. This bottom wall is provided with a threaded opening 22 to receive a fitting 23 which is connected with a vacuum line for applying vacuum to the interior of the cylinder below the piston.

The interior of the other cylinder 11 is supplied with a vacuum above its piston from a line 24A and pressure below the piston from a pressure line 18A. The lines 18 and 18A are connected with each other through a fitting 25 by means of which both lines are connected with a distributor valve 26. The vacuum lines 24 and 24A are likewise connected with each other through another fitting 26A by means of which they are connected with the distributor valve. The distributor valve is connected through a fitting 27 with a pressure line connected with any approved source of supply such as a pressure pump (not shown) driven by the engine of the vehicle. The distributor valve is also supplied with vacuum by means of a fitting 28 connected with a supply line coming from the intake manifold of the engine of the vehicle or from any other approved source of supply.

The distributor valve, as best illustrated in Figures 7 and 8, comprises a housing H having cavities 29, 30, 31 and 32 formed therein. A valve core 33 is rotatably mounted by means of bearings 34 within the housing by means of a shaft 35 whose one end is extended as at 36 and provided with a pendulum 37 by means of a shaft 38 which is locked as at 39 to the extended portion 36 of the shaft. Thus it will be seen that the core 33 of the valve will be rotated by the pendulum as it is swung to one side or the other by centrifugal force as the vehicle negotiates a turn to the left or to the right. The swing of the pendulum to the right or left is limited by limit stops 39A extending outwardly from the differential housing or if desired from the valve housing H. The core is formed with four arcuate ducts 40, 41, 42 and 43.

Figure 6:
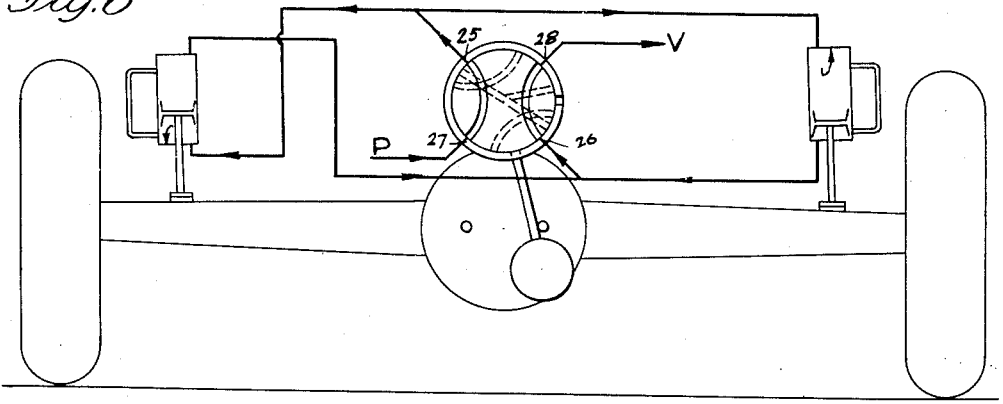

In operation, one end of the duct 43, upon rotation of the core 33 in the direction of the arrow applied to it, is moved into communication with the cavity 32 while the opposite end of the duct 43 is moved into communication with the cavity 31 which causes pressure to be directed from the source through the fitting 27, through the valve core, through fitting 25 and through both pressure lines 18 and 18A to the top and bottom of the cylinders 10 and 11 respectively. At the same time, one end of the duct 41 is moved into open communication with the cavity 29 while its opposite end is moved into communication with the cavity 30 thus establishing communication between the fitting 28, through the fitting 26 and into both vacuum lines 24 and 24A and into the bottom and top ends, respectively, of the cylinders 10 and 11. Thus by movement of the pendulum to the right as viewed in Figure 6, when the vehicle is negotiating a left hand turn, pressure will be applied to the top of the cylinder 10 to force itself upwardly in conjunction with the vacuum through line 24 to the bottom of the cylinder, while at the same time pressure through line 18A will force the cylinder 11 downwardly in conjunction with vacuum through line 24A. The bottom end of each shaft 20 is connected by any suitable means 20A to the axle. An exhaust duct E extends through the core 33 and is adapted to communicate with the cavities 30—32 (see also Fig. 4) when the pendulum is hanging in a neutral position while the vehicle is traveling straight ahead to thereby exhaust the system to the atmosphere through another exhaust duct 44 and an exhaust port 45 formed through the wall of the housing H.

In the modified form of the invention illustrated diagrammatically in Figure 9, the pistons within the cylinders 10A and 11A are connected by means of their shafts to the axles of the vehicle as aforesaid. Pressure is applied above and below each piston instead of pressure and vacuum as in the other form of the invention. Pressure is directed from a source P, through a distributor valve comprising a cylinder 46, by means of a line 47 into the top of the cylinder 11A and by a connecting line 48 into the bottom of the cylinder 10A. Pressure may also be selectively directed into the bottom of the cylinder 11A by a line 49 and by a connecting line 50 into the top of the cylinder 10A.

Within the cylinder 46 of the distributor valve I slidably mount a plurality of pistons, 51, 52, and 53, arranged in spaced relation to each other as shown and secured to or formed integral with a common shaft 54 whose ends connect as at 55 and 56 with cores 57 and 58, respectively, of solenoids 59 and 60, respectively.

One side of solenoid 59 is connected by wire 61 with one side 62 of a switch generally indicated at S. The opposite side of the solenoid 59 is connected by wire 63 with one side of a battery indicated at B. The opposite side of the battery is connected by wire 64 with a pendulum switch comprising an arm 65 pivotally mounted as at 66 to the chassis at any convenient location and insulated therefrom by a section of insulating material 66A. The lower end of the shaft is provided with a weight 67 and its upper end is provided with a switch blade 68 adapted to close a circuit from the battery through either side of the switch S to either of said solenoids, the solenoid 60 being connected to the opposite side of said switch by wire 69 and to the battery by wire 70.

With the parts in the positions shown in Figure 9, solenoid 60 is being energized because of the pendulum having been swung to the left as the vehicle is negotiating a right hand turn. This position of the pendulum and resultant closing of the switch and the energization of solenoid 60 pulls the pistons to the positions shown, whereby pressure is allowed to pass through the cylinder between the center and right hand pistons, 52 and 53 respectively, and out through pressure line 47 to top of cylinder 11A and through connecting line 48 into the bottom of cylinder 10A. The pressure entering into the bottom end of the cylinder 10A and being applied to the under side of the piston in said cylinder and against the bottom end wall thereof, forces the cylinder 10A downwardly with respect to the shaft of the piston and that end of the axle to which it is attached. This pressure between the piston and the end wall, and the resultant downward movement of the cylinder to which one side member of the frame is attached, will, of course, hold that side of the chassis more or less in a fixed position, while at the same time the pressure above the piston within the cylinder 11A will tend to move that cylinder upwardly to hold the cylinder and the other frame member to which it is attached in a fixed position, thereby preventing any tilting of the chassis.

When the vehicle is traveling in a forward direction and the pendulum is in a normal or vertical position, neither solenoid will be energized, and the pistons will be returned to a neutral position by compresson springs 71 and 72 interposed between the outside pistons and the ends of the cylinder 46. When in a neutral position, the center piston 52 will seal off the pressure supply line entering the cylinder, but at the same time will not close off the exhaust lines 73 and 74. With the pistons 51, 52 and 53 in the positions shown, it will be noted that while pressure is being applied through lines 47—48 to the top and bottom of cylinders 11A and 10A, respectively, the top of cylinder 10A and the bottom of cylinder 11A are open to the exhaust 73 through lines 50 and 49 respectively. When the pistons are drawn to the right as viewed in Figure 9, the application of pressure and the exhausting of the cylinder are reversed.

In the further modified form of the invention shown diagrammatically in Figure 10, a pressure line 75 communicates with two branch pressure lines 76 and 77, each of which communicates with a vertical cylinder 78 and 79, respectively, through ports 80 and 81, respectively, formed in said cylinders. A spring-pressed piston 82 and 83 is slidably mounted within said cylinder, and each is provided with a leak-proof disc 84. The cylinders may be attached to or formed integral with a U-shaped tubular member 85 interconnecting both cylinders and filled with mercury. With the pistons in the positions shown in Figure 10, the vehicle is traveling in a forward direction, and therefore pressure is cut off from the cylinders attached to the frame members as aforesaid. When, however, the vehicle goes into a right or left hand turn, the mercury within the tubular member 85 will flow to one side or the other and accordingly lift the corresponding piston within the corresponding cylinder and thereby open its respective port to direct the pressure from the pressure branch lines to the top of one cylinder and bottom of the other in accordance with the turn being negotiated.

In the still further modified form of the invention illustrated in Figure 11, pressure from a supply line 86 is directed into the branch supply lines 87 and 88, each of which is ported as at 89 and 90, and each port may be opened and closed by pistons 91 and 92, movable in horizontal cylinders 93 and 94 and backed by compression springs 95 and 96. Each piston is provided with a shaft 97 and 98 whose inner ends are in contact with a ball 99 disposed within and attached to roll from end to end of a cavity 100. A right hand turn of the vehicle will cause the ball 99 to move to the left as in Figure 11, with a resultant uncovering of the port 90 which will allow pressure to be directed to the top of the cylinder 11A and to the bottom of the cylinder 10A. A turn to the left, of course, will cause the ball to move to the right with a resultant opening of the port 89, allowing the pressure to flow to the bottom end of the cylinder 11A and to the top end of the cylinder 10A, with a resultant stabilizing of the chassis in a horizontal or untilted position.

In the modification shown in Figure 12 the valve core 33A is rotatable within the valve housing H¹ by means of a pendulum 38A as in the form shown in Figures 7 and 8. The housing is provided with exhaust ports 101, 102, 103 and 104 adapted to be connected with ports 105, 106, 107 and 108 respectively by means of ducts 109, 110, 111 and 112 when the vehicle is traveling straight ahead and the pendulum is hanging in a neutral position as shown. Assuming port 101 is connected to the bottom of cylinder 11, port 106 to the top of cylinder 11, port 107 to the top of cylinder 10 and port 104 to the bottom of cylinder 10 it will be seen that any pressures generated by movement of the pistons within said cylinders will be exhausted to the atmosphere through the ducts 109, 110, 111 and 112 and their respective exhaust ports, namely, 101, 102, 103 and 104.

The core 33A is formed with a pressure intake duct 113 opening into two distributor ducts 114 and 115 and the housing is also provided with pressure intake ports 116 and 117. Rotation of the core in either direction by the action of the pendulum 38 will move the pressure intake port 113 in the core into communication with either of the intake ports 116 and 117. With the duct 113 in communication with the port 117 the distributor duct 114 will be in communication with the port 105 connected to the bottom end of cylinder 11 while at the same time distributor duct 115 will be in communication with port 107 which is connected to the top end of cylinder 10 and whereby pressure is directed below the piston in cylinder 11 and above the piston in cylinder 10. Rotation of the core in the opposite direction will reverse the application of pressure when the pressure intake duct 113 communicates with the pressure intake port 116 and the distributor ports 114 and 115 then communicate with ports 106 and 108 respectively. Limit stops 39B are associated with the valve housing to limit the right or left swing of the pendulum as shown in broken lines.

While I have shown particular forms of embodiment of my invention, I am aware that many minor changes therein will readily suggest themselves to others skilled in the art without departing from the spirit and scope of the invention. Having thus described my invention, what I claim as new and desire to protect by Letters Patent is:

A sway stabilizer for a vehicle having a chassis and at least one transverse axle yieldingly attached thereto, comprising in combination, a pair of spaced-apart cylinders secured to the chassis of the vehicle above said axle, a piston slidably mounted within each of said cylinders and connected to said axle, a pressure and vacuum distributor valve carried by the vehicle, said valve comprising a cylindrical housing having two pairs of diametrically opposed ports and an exhaust port formed therein, one port in one of said pairs being connected to a source of fluid pressure and one port in the other pair being connected to a source of vacuum, the other port in said one pair being connected to and in open communication with the interior of the bottom end of one of said cylinders and with the interior of the top of the other cylinder by feed lines, the other port in said other pair of ports being connected to and in open communication with the interior of the top of said one of said cylinders and with the interior of the bottom of said other of said cylinders, a core rotatably mounted within said valve housing, a pendulum secured to the core and adapted to rotate the same by swinging movement toward either side of the vehicle, said core having a plurality of arcuate-shaped ducts formed therein with their open ends in spaced relation to each other about the periphery of the core, the space between the open ends of each of said ducts being equal to the peripheral spacing between any two of said ports in the housing whereby one pair of said ducts when said core is in one position will direct pressure to the interior of the bottom of said one of said cylinders and to the interior of the top of said other of said cylinders, and also direct vacuum to the interior of the top of said one of said cylinders and to the interior of the bottom of said other of said cylinders, and when in another position direct pressure and vacuum in a reverse flow to the opposite ends of said cylinders, and when in an intermediate position will seal off pressure and vacuum to both of said cylinders, a duct extending diametrically through said core and adapted to be moved into communication with said pressure and vacuum feed lines, an exhaust duct in open communication at one of its ends with said diametrically extending duct and adapted at its opposite end for open communication with the atmosphere through said exhaust port when said core is in said intermediate position to exhaust the top and bottom interiors of both of said cylinders.

References Cited in the file of this patent

UNITED STATES PATENTS

| Number | Name | Date |
| --- | --- | --- |
| 2,073,180 | Rink | Mar. 9, 1937 |
| 2,095,833 | Rockwell | Oct. 12, 1937 |
| 2,110,809 | Murphy | Mar. 8, 1938 |
| 2,353,503 | Rost et al. | July 11, 1944 |
| 2,474,471 | Dolan | June 28, 1949 |

FOREIGN PATENTS

| Number | Country | Date |
| --- | --- | --- |
| 518,848 | Great Britain | Mar. 8, 1940 |